US010296666B2

(12) United States Patent
Brier et al.

(10) Patent No.: US 10,296,666 B2
(45) Date of Patent: May 21, 2019

(54) PHOTO-VOLTAIC (PV) MODELING TOOL

(71) Applicant: SolarCity Corporation, San Mateo, CA (US)

(72) Inventors: Travis Brier, San Francisco, CA (US); Jesse LaRue, San Francisco, CA (US)

(73) Assignee: SolarCity Corporation, San Mateo, CA (US)

(*) Notice: Subject to any disclaimer, the term of this patent is extended or adjusted under 35 U.S.C. 154(b) by 481 days.

(21) Appl. No.: 14/744,682

(22) Filed: Jun. 19, 2015

(65) Prior Publication Data
US 2016/0275212 A1    Sep. 22, 2016

Related U.S. Application Data

(60) Provisional application No. 62/135,584, filed on Mar. 19, 2015.

(51) Int. Cl.
*G06F 17/50* (2006.01)
*H02S 20/25* (2014.01)
*G06Q 10/06* (2012.01)
*H02S 50/00* (2014.01)

(52) U.S. Cl.
CPC ...... *G06F 17/5004* (2013.01); *G06F 17/5009* (2013.01); *G06Q 10/06313* (2013.01); *H02S 20/25* (2014.12); *H02S 50/00* (2013.01); *G06F 2217/78* (2013.01); *Y02B 10/12* (2013.01)

(58) Field of Classification Search
CPC ............ G06F 17/5004; G06F 17/5009; G06F 2217/78; H02S 50/00; H02S 20/25; G06Q 10/06313; Y04S 10/54; Y02B 10/12
See application file for complete search history.

(56) References Cited

U.S. PATENT DOCUMENTS

| | | | | |
|---|---|---|---|---|
| 2009/0304227 | A1* | 12/2009 | Kennedy | G06K 9/0063 382/100 |
| 2011/0205245 | A1* | 8/2011 | Kennedy | F24J 2/40 345/636 |
| 2013/0061198 | A1* | 3/2013 | Brier | G06F 3/0481 716/139 |
| 2013/0246010 | A1* | 9/2013 | Dershowitz | H01L 31/042 703/1 |
| 2014/0025343 | A1* | 1/2014 | Gregg | G06F 17/5004 703/1 |

* cited by examiner

*Primary Examiner* — Dwin M Craig
(74) *Attorney, Agent, or Firm* — Kilpatrick Townsend & Stockton LLP

(57) ABSTRACT

Systems and methods for determining an optimum number of PV modules and predicting energy generation for a solar photovoltaic (PV) system are disclosed. In one embodiment, a method is provided that includes receiving an address and zip code of a proposed installation site, and displaying an image of the proposed installation site. The method includes receiving an input identifying a mounting plane on the image, displaying the mounting plane, determining an optimum number of PV modules that would fit within the mounting plane, and displaying the optimum number of PV modules on the mounting plane. The method includes sending a request for roof pitch data for neighboring sites within the zip code, receiving the roof pitch data, determining an average roof pitch based on the roof pitch data, and predicting PV generation based on the number of PV modules in the mounting plane and the average roof pitch.

20 Claims, 11 Drawing Sheets

PHOTO-VOLTAIC (PV) MODELING TOOL

CROSS-REFERENCES TO RELATED APPLICATIONS

This application claims priority to U.S. Provisional Application No. 62/135,584, filed Mar. 19, 2015, the entire contents of which are incorporated by reference in its entirety for all purposes.

BACKGROUND

The present disclosure relates in general to solar photo-voltaic (PV) modeling tools, and in particular to PV modeling tools for estimating PV energy generation for an installation site.

In recent years, climate change concerns, federal/state initiatives, and other factors have driven a rapid rise in the installation of renewable energy generation (EG) systems (i.e., systems that generate energy using renewable resources such as solar, wind, hydropower, etc.) at residential and non-residential sites. Solar photovoltaic (PV) systems, in particular, have been very popular EG systems.

Currently, the process of installing PV panels for a proposed PV system requires three parties: a salesman, a surveyor, and an installer. The salesman explains to a potential customer all the benefits of a PV system, as well as explains how the PV system may be configured and how it would look. If the potential customer decides to purchase the PV system, then the surveyor visits the installation site and measures the installation site to determine how the PV system will actually be configured. Thereafter, the installer visits the site and installs the PV system. This entire process can be time-consuming and cumbersome, particularly for high volume system vendors/installers. Therefore, it is important for industry leaders to find ways to improve on this process.

SUMMARY

Embodiments of the present invention relate to systems and methods for determining an optimal PV panel configuration and predicting energy generation of a modeled solar photovoltaic (PV) system. The method includes predicting the roof pitch of an installation site by gathering roof pitch data of neighboring buildings, and determining an average roof pitch of the neighboring buildings. The average roof pitch is then used to determine the optimum solar panel configuration and to predict the amount of energy that could be generated from the installation site. Utilizing this method may provide for a more accurate prediction of the amount of energy that the installation site may produce in a period of time. Additionally, utilizing this method may save cost and time associated with conventional operation processes by avoiding the need for a salesman.

According to one embodiment, a method of online photo-voltaic (PV) module installation modeling includes receiving an address and zip code of a proposed installation site, displaying an image of the proposed installation site, and receiving an input identifying a mounting plate on the image, where the mounting plane corresponds to a selected bounded region to install a PV module array. The method includes displaying the mounting plane on the image of the proposed installation site, determining an optimum number of PV modules that would fit within the mounting plane, and displaying the optimum number of PV modules on the mounting plane. The method further includes sending a request for roof pitch data for neighboring sites within the zip code, receiving the roof pitch data, determining an average roof pitch based on at least a portion of the roof pitch data, and calculating a predicted PV generation based on the number of PV modules in the mounting plane and the average roof pitch.

In some embodiments, the neighboring sites comprise residences or buildings within a neighborhood. The proposed installation site and neighboring sites may be located within the same neighborhood. In an embodiment, the proposed installation site and the neighboring sites have similar housing structures. In some embodiments, the roof pitch data includes more than one roof pitch of the residences or buildings within the neighborhood. The neighboring sites may be within a five mile radius of the proposed installation site. In an embodiment, the image of the proposed installation site is a satellite or aerial image. In some embodiments, the mounting plate includes a plurality of points defining a polygon, the polygon having been drawn on the image by a user. In embodiments, the polygon is drawn on a roof surface of the proposed installation site, where the proposed installation site is a residence or building.

In an embodiment, a system includes a processor configured to receive an address and zip code of a proposed installation site, display an image of the installation site, and receive an input identifying a mounting plane on the image, where the mounting plane corresponds to a selected bounded region to install a PV module array. The processor may be configured to display the mounting plane on the image of the proposed installation site, determine an optimum number of PV modules that would fit within the mounting plane, and display the optimum number of PV modules on the mounting plane. The processor may be further configured to send a request for roof pitch data for neighboring sites within the zip code, receive the roof pitch data, determine an average roof pitch based on at least a portion of the roof pitch data, and calculate a predicted PV generation based on the number of PV modules in the mounting plane and the average roof pitch.

In some embodiments, the neighboring sites include residences or buildings within a neighborhood. The proposed installation site and the neighboring sites may be located within the same neighborhood. In an embodiment, the proposed installation site and the neighboring sites have similar housing structures. The roof pitch data may include more than one roof pitch of the residences or buildings within the neighborhood.

In an embodiment, a computer-readable storage medium having stored thereon program code executable by a computer system, the program code including code that causes the computer system to receive an address and zip code of a proposed installation site, code that causes the computer system to display an image of the proposed installation site, and code that causes the computer system to receive an input identifying a mounting plane on the image, where the mounting plane corresponds to a selected bounded region to install a PV module array. The program code may also include code that causes the computer system to display the mounting plane on the image of the proposed installation site, code that causes the computer system to determine an optimum number of PV modules that would fit within the mounting plane, and code that causes the computer system to display the optimum number of PV modules on the mounting plane. The program code may also further include code that causes the computer system to send a request for roof pitch data for neighboring sites within the zip code, code that causes the computer system to receive the roof pitch data, code that causes the computer system to determine an average roof pitch based on at least a portion of the roof pitch data, and code that causes the computer system to calculate a predicted PV generation based on the number of PV modules in the mounting plane and the average roof pitch.

In some embodiments, the neighboring sites include residences or building within a neighborhood. The proposed installation site and the neighboring sites may be located within the same neighborhood. In an embodiment, the proposed installation site and the neighboring sites have similar housing structures. The roof pitch data may include more than one roof pitch of the residences or buildings within the neighborhood.

DETAILED DESCRIPTION

Figure 1A:
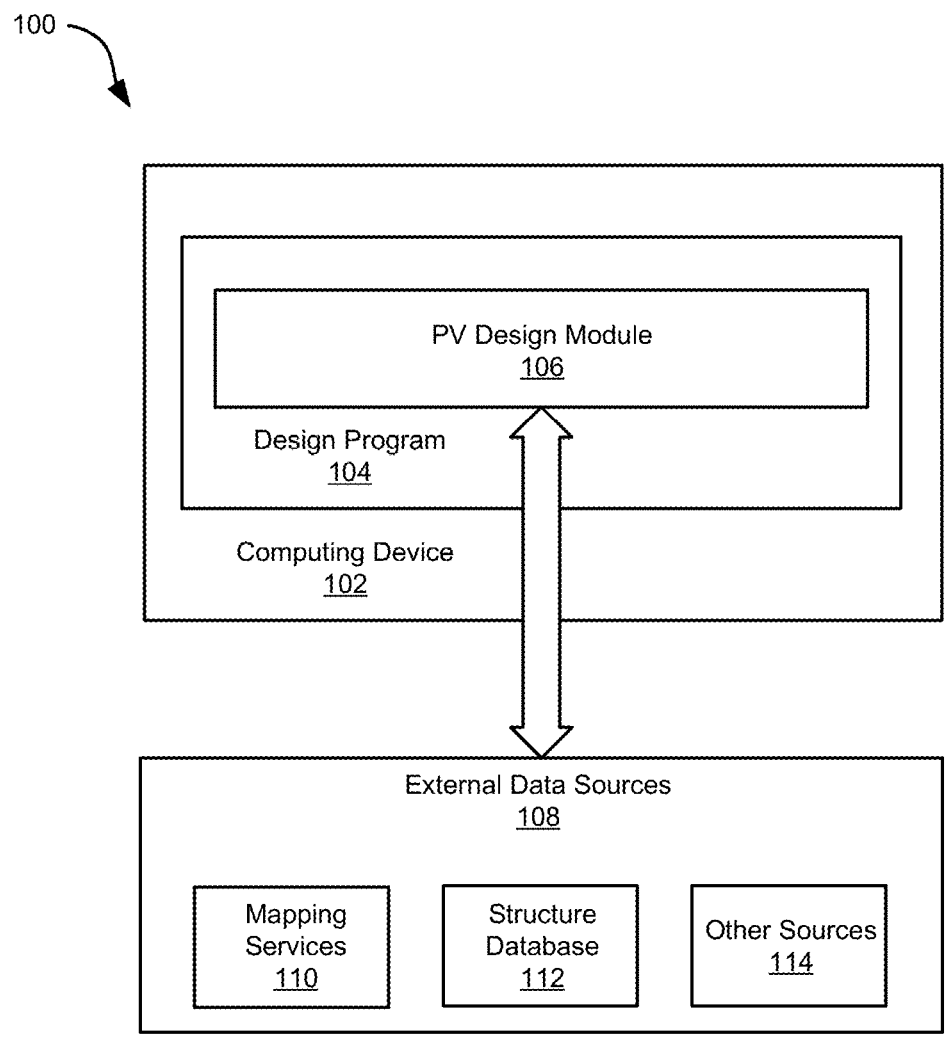
FIG. 1A is a simplified block diagram of a PV system in accordance with an embodiment of the present invention.

In the following description, numerous examples and details are set forth in order to provide an understanding of embodiments of the present invention. It will be evident to one skilled in the art, however, that certain embodiments can be practiced without some of these details, or can be practiced with modifications or equivalents thereof.

Embodiments of the present invention provide a computer-implemented tool for determining an optimum PV panel configuration and for predicting the amount of PV energy generated for an installation site. In one embodiment, the tool can be implemented as a standalone (e.g., desktop) software application configured to run autonomously on one or more computer devices. In another embodiment, the tool can be implemented as a distributed software application hosted on, e.g., a web or application server.

In operation, the tool can receive an address and zip code of a proposed installation site and display an image of the proposed installation site. By way of example, if the site is a residence, this step can include retrieving a satellite or aerial image of the residence from a publically accessible mapping service. The tool can then receive, from a user, a definition of one or more mounting planes at the site, and automatically determine a configuration of PV panels that fit within the user-defined mounting planes. For instance, the definition of the mounting planes can be received as a series of points comprising one or more polygons, and the tool can determine the number and layout of PV panels that fit within the areas of the polygons. Once the configuration of PV panels has been determined, the tool can display the determined panel configuration on top of (i.e., superimposed on) the site image. According to an embodiment of the invention, the tool can then send a request for roof pitch data of neighboring sites. For instance, the tool can send a request to a database to determine the roof pitches of nearby homes. An average of the roof pitch data can then be calculated and used to predict an amount of PV generation that could be generated by the PV system at the installation site. Roof pitch data affects the prediction because the pitch of solar panels affects its efficiency in generating energy. For instance, an optimal panel pitch is when the sun's rays are normal to the PV panels. In such instances, photons collide with the PV panels at an angle perpendicular to the PV panels, thereby efficiently generating energy.

With the foregoing features, an accurate prediction of the PV generation can be generated for a potential client. This information may allow the potential client to make an informative decision as to whether installing a PV generation system is economically feasible. Additionally, the foregoing features save cost and time. The entire prediction process does not require a salesman to visit a potential installation site. Rather, this sales process can be carried out remotely, and various site parameters that are needed for pitching the design (e.g., determining the optimum number of PV panels for the installation site, predicting energy generation at the installation site, etc.) can be automatically deduced from the imagery retrieved for the site.

FIG. 1A is a simplified block diagram of a system environment 100 according to an embodiment of the present invention. In an embodiment, the system environment 100 includes a computing device 102 configured to execute a three-dimensional (3D) design program 104. Computing device 102 may be an end-user computing device, such as a desktop computer, a laptop computer, a personal digital assistant, a smartphone, a tablet, or the like. 3D design program 104 may be a software application that enables the creation of 3D content (e.g., models, scenes, etc.). Examples of such programs include Trimble SketchUp, AutoCAD, and the like. Additional examples include 3D web browser programs that can display 3D renderings of the proposed installation site.

Within the context of a 3D design program 104, computing device 102 may be further configured to execute a PV design module 106. In certain embodiments, PV design module 106 is implemented as an optional plug-in to 3D design program 104. In other embodiments, PV design module 106 is implemented as an integral component of program 104. PV design module 106 can provide, in conjunction with 3D design program 104, various functions that facilitate the design and visualization of a PV system. For example, in one embodiment, PV design module 106 can retrieve a satellite or aerial image of a site where a PV system is to be installed and allow a user to draw one or more mounting planes on the site image. PV design module 106 can then automatically determine a configuration of PV panels that fit within the user-defined mounting planes and display the determined panel configuration on top of (i.e., superimposed on) the image. Additionally, PV design module 106 can determine the average roof pitch of neighboring buildings, and generate, based on the average roof pitch, an accurate production estimate for PV system in the determined panel configuration.

As part of its processing, PV design module 106 can interact with one or more external data sources 108 (e.g., mapping services 110, structure database 112, and other sources 114) to retrieve data used during the design process. For example, PV design module 106 can access mapping services 110 to retrieve satellite/aerial imagery for an installation site. PV design module 106 may then gather information from the imagery, such as roof pitch data. As another example, PV design module 106 can access structure database 112 to gather roof pitch data for neighboring structures of a potential installation site, and then determine an average roof pitch of structures in the general vicinity of the potential installation site. Additionally, PV design module 106 can access other sources 114 to retrieve information regarding PV system components that are available for purchase/installation at the site. Although external data sources 108 are depicted as being remote from computing device 102, in certain embodiments one or more of data sources 108 may be stored locally on computing device 102.

Figure 1B:
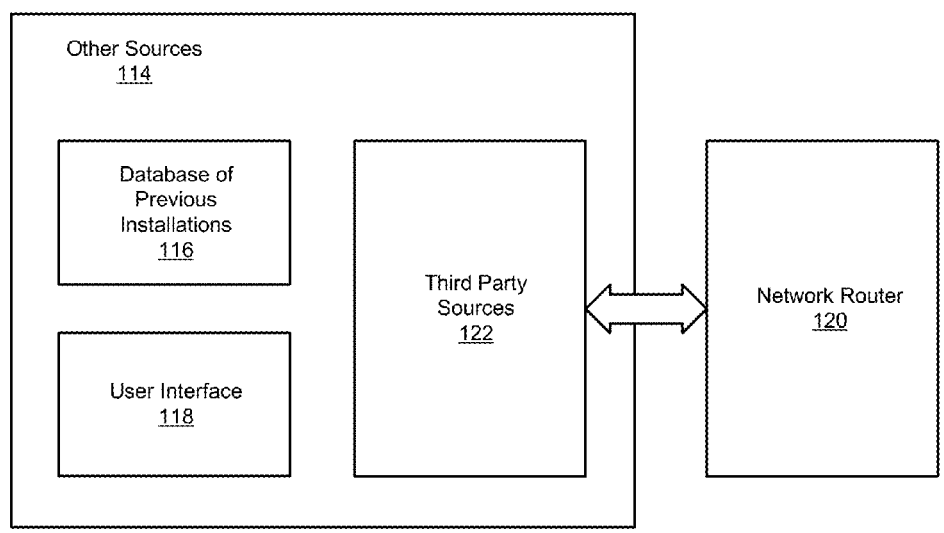
FIG. 1B is a simplified block diagram of other sources for a PV system in accordance with an embodiments of the present invention.

FIG. 1B is a simplified block diagram illustrating examples of other sources 114. In embodiments, other sources 114 may include a database of previous installations 116. For instance, the database of previous installations 116 may be a memory bank, such as a solid state drive or a hard drive, that is capable of storing digital data. In certain embodiments, the database of pervious installations 116 stores structural data, including roof pitch data, of previous installation sites. Such structural data may be entered in by an installer, or an administrator reading from measurements generated by an installer, when installing a PV system.

Other sources 114 may also include a user interface 118. User interface 118 may be any suitable user interface with which a user may interact to input information into a memory bank. For instance, user interface 118 may be a window on a computer screen in which a user may input information about the installation site. In certain embodiments, information relating to the structure of the installation site, such as a roof pitch of the installation site, may be entered into the computer by the user and stored in a hard drive or a solid state drive. This may be particularly useful when the user is an installer of the PV system or an owner of a home who has knowledge of such information.

Furthermore, other sources 114 may also include third party sources 122. In embodiments, third party sources 122 may be coupled to a network router 120. Network router 120 may be disposed in computing device 102, and may be any suitable device capable of connecting to a network for acquiring information about the installation site from third party sources 122. Third party sources 122 may be a company that retrieves satellite/aerial imagery for an installation site. In some embodiments, third party sources 122 may also analyze the imagery to determine structural information of the installation site. For example, third party sources 122 may analyze imagery to determine roof pitch data of the installation site.

It should be appreciated that system environment 100 is illustrative and is not intended to limit embodiments of the present invention. For example, the various entities depicted in system environment 100 can have other capabilities or include other components that are not specifically described. One of ordinary skill in the art will recognize many variations, modifications, and alternatives.

Figure 2:
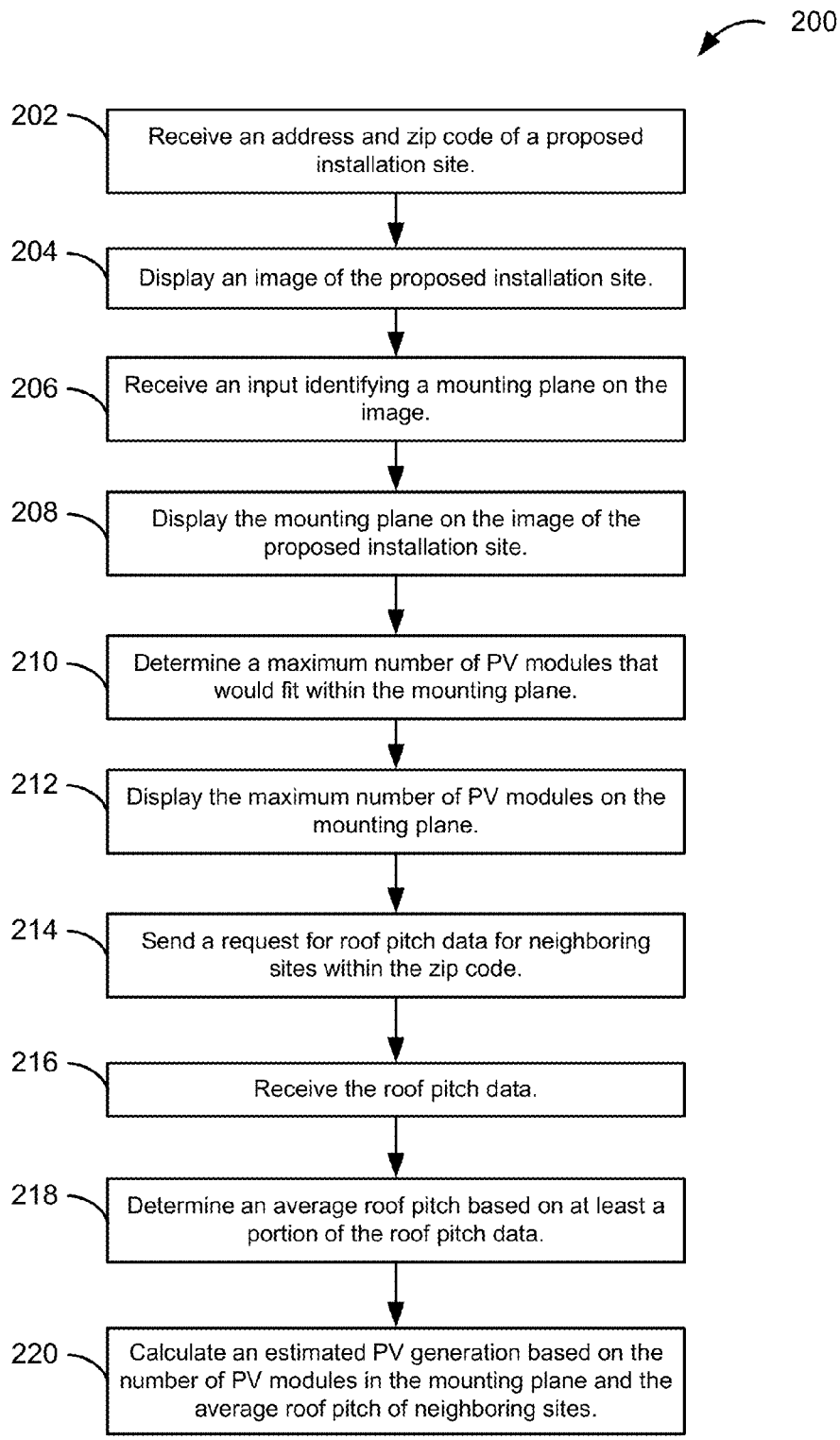
FIG. 2 is a flow diagram of a process for determining an optimum number of PV modules and predicting an energy generation of a PV system in accordance with an embodiment of the present invention.

FIG. 2 illustrates a process 200 that can be carried out by PV design module 106 of FIG. 1 for accurately predicting an energy generation of a PV system that can be implemented on any solar platform, according to an embodiment of the present invention. At block 202, PV design module 106 can receive an address and zip code of a proposed installation site. For instance, a user, such as a potential customer or an installation technician, may enter an address and zip code of a house at which a PV system may be installed. At block 204, PV design module 106 may display an image of the proposed installation site. The displayed image can be, e.g., a satellite image, aerial image, or any other type of image that is usable for delineating mounting planes for PV panels at the site. In one embodiment, the image can be retrieved from a publically accessible mapping website or service (e.g., mapping services 110 of FIG. 1), such as Google Maps™, Bing Maps™, and the like. In addition, the image can be retrieved from LIDAR data, which can include accurately measured dimensions of the potential installation site from laser measurement technology. Once retrieved, the image can be displayed in the context of 3D design program 104 to a user.

At block 206, PV design module 106 can receive an input identifying a mounting plane on the image. For instance, if the site is a residence or building, the user can draw, on top of the displayed site image, a polygon (via, e.g., a series of points/lines) outlining a roof surface of the residence or building. Alternatively, instead of manually drawing the mounting plane, LIDAR data can be used to automatically draw the mounting plane. Once the user has identified the mounting plane, at block 208, PV design module 106 may display the mounting plane on the image of the proposed installation site.

At block 210, PV design module 106 can determine an optimal number of PV modules that would fit within the mounting plane. In certain embodiments, this process can include determining the actual area of each mounting plane in view of the heading and elevation at which the site image was originally taken, as further explained in US Patent Publication US 2014/0032178, which is incorporated by reference in its entirety for all purposes. Additionally, this process may take into consideration the locations of nearby obstacles. For instance, the process may identify the location of nearby obstacles that cast a shadow on the mounting plane. Shadows cast upon PV systems may decrease the efficiency of certain PV modules that are disposed underneath the shadows. Accordingly, PV design module 106 may determine that PV modules should not be placed in those locations, and exclude those modules when determining the optimal number of PV modules for the mounting plane. At block 212, PV design module 106 may display the optimum number of PV modules that would fit within the mounting plane. For example, PV design module 106 can display the panel configuration on top of (i.e., superimposed on) the site image in 3D design program 104. In this manner, the user can easily visualize how the site will look post-installation (i.e., with the PV panels installed).

At block 214, PV design module 106 may send a request for roof pitch data for neighboring sites within the zip code. For instance, PV design module 106 may request for roof pitch data of houses within the same zip code as the potential installation site. In another example, PV design module 106 may request for roof pitch data of houses within the same neighborhood as the potential installation site. In yet another example, PV design module 106 may request roof pitch data for houses within a certain radial distance of the potential installation site, such as houses within 5 miles of the installation site. Additionally, PV design module 106 may request roof pitch data depending on the density of the data set. For instance, if there are a large number of houses with roof pitch data in a small area, the PV design module 106 may actively request for that roof pitch data. Higher density roof pitch data may yield a more accurate estimate of the roof pitch of the proposed installation site. Alternatively, if there are only a few houses with roof pitch data in a large, widespread area, the PV design module 106 may not request for those roof pitch data. The PV design module 106 may request data from its own database, or a database of a third party. The third party may be any suitable party that may have information useful for determining an optimal number of PV modules for a PV system, and for accurately predicting energy generation of the PV system. As an example, the third party may be a weather station or a housing developer.

Following the request for roof pitch data, PV design module 106 may receive the roof pitch data (at block 216), and subsequently determine an average roof pitch based on at least a portion of the roof pitch data (at block 218). For instance, if the PV design module 106 receives roof pitch data for five homes, the PV design module 106 may average the pitches of all five homes, or average the pitches of only four of the five homes if it is known that one of the homes has recently changed its roof pitch and the new pitch is unknown. In embodiments, the average roof pitch data is a good estimate of the actual roof pitch of the installation site.

At block 220, PV design module 106 may calculate a predicted PV generation based on the number of PV modules in the mounting plane and the average roof pitch. Utilizing the average roof pitch of neighboring homes for the calculation allows the PV design module 106 to design an optimal PV system and to generate a more accurate prediction of the energy generation of the PV system. Accordingly, potential customers may make an informed decision as to whether installing the PV system is economically feasible. In embodiments disclosed herein, a salesman is not required to travel to the site to determine an optimal number of PV modules for the PV system or predict the energy generation of the PV system for the customer.

Although embodiments disclosed herein request for roof pitch data, any data that would increase the accuracy of the predicted energy generation can be requested by the PV design module 106. As an example, PV design module 106 may request weather history data from a weather station for a given area in which the proposed installation site is located. Weather history data may be particularly important when the proposed installation site is in an area that has consistent weather patterns that affect a PV system's exposure to sunlight. For instance, if the proposed installation site is in Seattle, Wash. where there are more cloudy days than an area that is consistently sunny, such as Phoenix, Ariz., the weather history data may help the PV design module 106 more accurately predict energy generation of the PV system. The PV design module 106 may take this into consideration by decreasing the predicted energy generation by a proportionate amount.

Additional details regarding the processing performed at the various blocks of FIG. 2, along with other features and advantages of the present invention, are provided in the sections below.

Displaying Site Image

Figure 3:
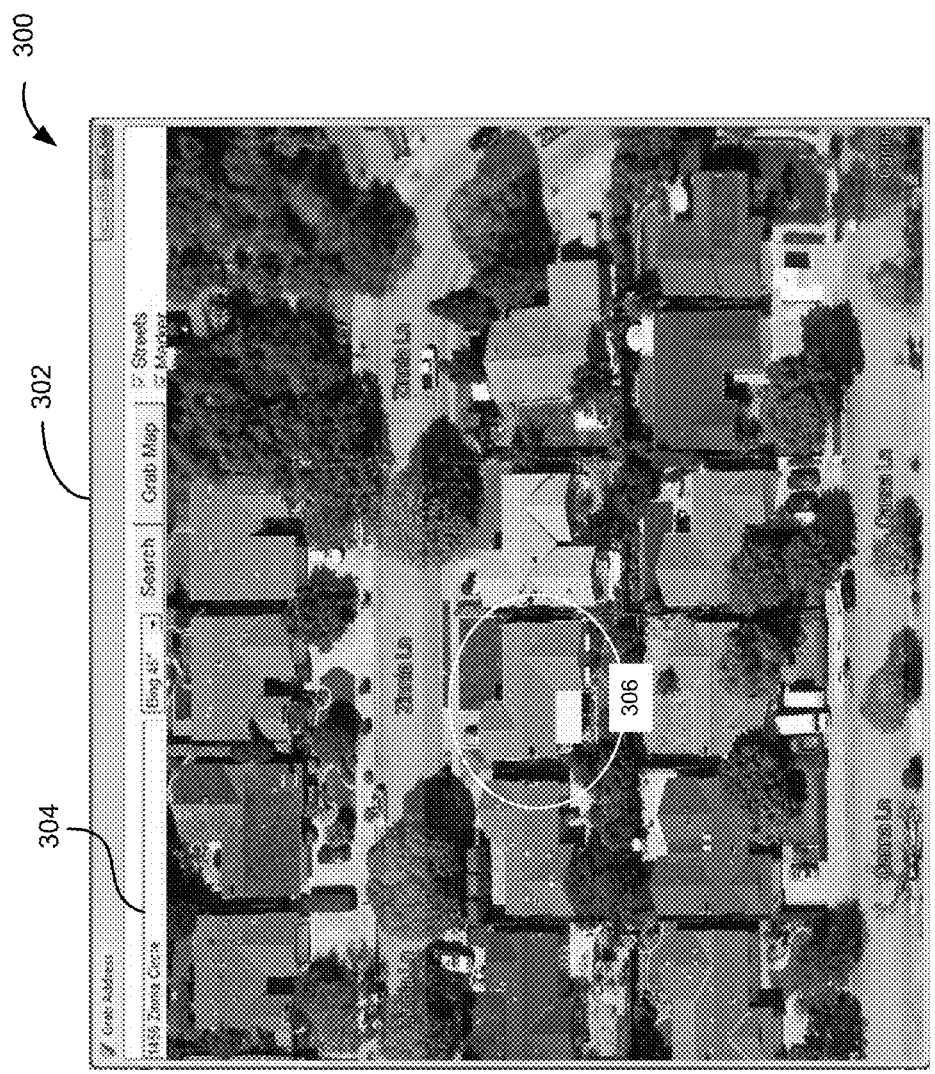
FIG. 3 is an example graphical user interface for retrieving an image of an installation site in accordance with an embodiment of the present invention.
Figure 4:
FIG. 4 is an example graphical user interface displaying a retrieved site image in accordance with an embodiment of the present invention.

As described with respect to blocks 202 through 204 of FIG. 2, PV design module 106 is configured to initially receive an address representing a potential installation site, and then display an image (e.g., satellite, aerial, etc.) of the potential installation site. In a particular embodiment, this is carried out by generating and presenting a "grab address" user interface, such as user interface 300 of FIG. 3. As shown in FIG. 3, user interface 300 includes, input fields 304 for entering a site address and specifying a source mapping service and image type (e.g., Bing 45 degrees, Google 45 degrees, etc.). In response to receiving a particular address, PV design module 106 can access the specified mapping service and retrieve an image of the address location, such as a potential installation site 306 illustrated as a single-family home. The retrieved image can then be displayed in a main window of 3D design program 104 (e.g., window 400 of FIG. 4).

In alternative embodiments, PV design module 106 can provide a facility for importing the site image (in various image formats) into program 104. In addition, PV design module 106 can give a user the ability to use blueprints or designs of houses for PV panel design.

Displaying Optimum Number of PV Modules

Figure 5:
FIG. 5 is an example graphical user interface for entering a definition of a mounting plane in accordance with an embodiment of the present invention.

Per blocks 206 through 212 of FIG. 2, once an image of an installation site has been displayed, PV design module 106 can display the optimum number of PV modules that can fit in one or more mounting planes at the installation site. In a particular embodiment, the mounting plane can correspond to a polygon that is drawn as a series of points or lines on top of the site image within 3D design program 104. FIG. 5 is an example user interface 500 that illustrates such a polygon 502 being drawn on the site image retrieved in FIGS. 3 and 4. The polygon 502 may be drawn around available space on a rooftop of an installation site, such as the single-family home 306. For instance, the polygon 502 may be drawn to avoid encircling the chimney 504 as shown in FIG. 5.

Figure 6:
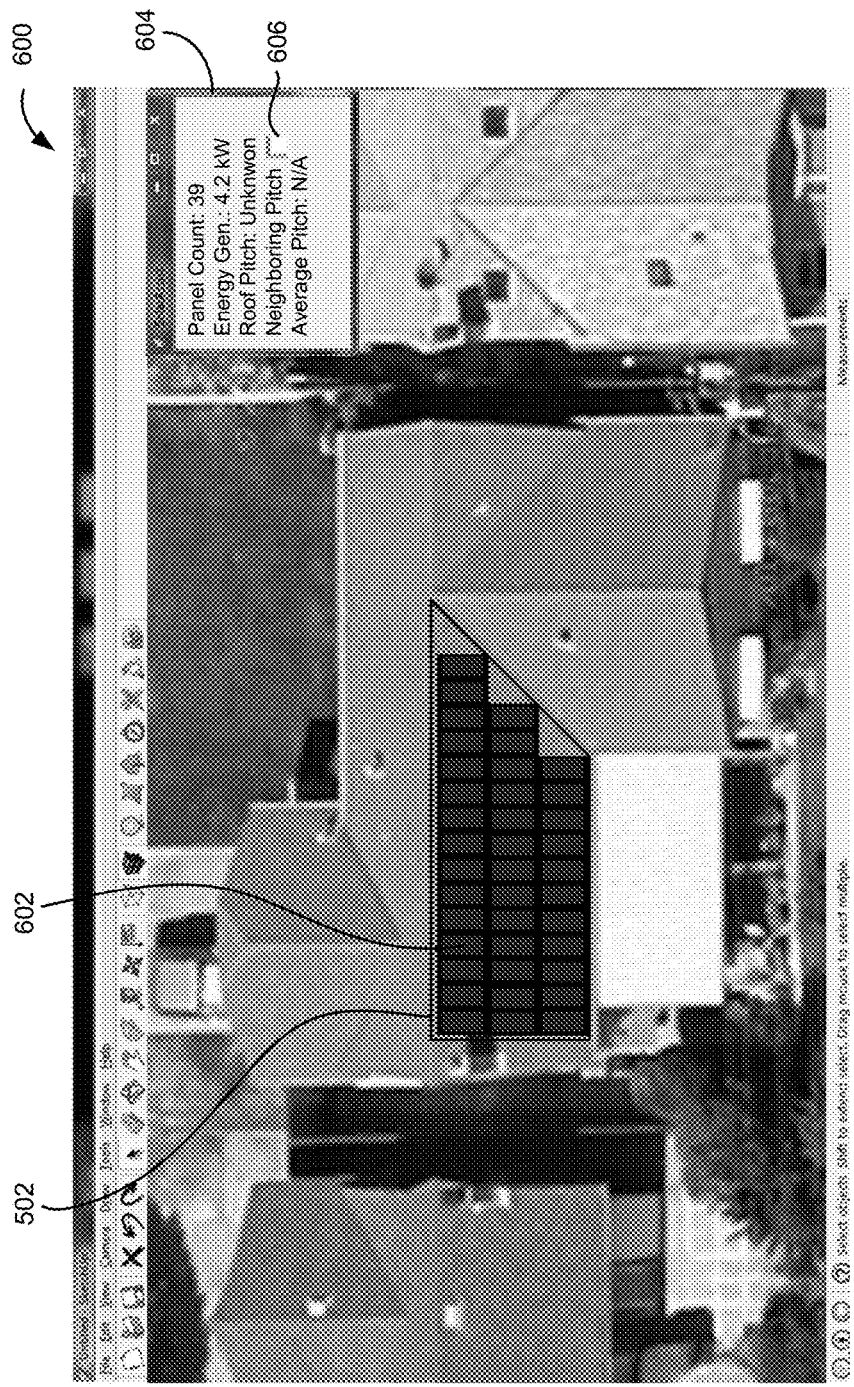
FIG. 6 is an example graphical user interface depicting a configuration of PV panels that have been added to a user-defined mounting plane in accordance with an embodiment of the present invention.

After the mounting plane definitions have been received, PV design module 106 can determine a configuration of PV panels that fits within the boundaries of the user-defined mounting plane, and can subsequently display the determined panel configuration on top of (i.e., superimposed on) the site image (see blocks 210 and 212 of FIG. 2). FIG. 6 is an example user interface 600 that depicts the mounting plane of FIG. 5 after it has been populated with PV panels 602 per the processing of block 212 of FIG. 2. As shown, the panel configuration is superimposed directly on top of the site image, thereby providing the user a visual mockup of the final, installed system.

Calculating Predicted PV Generation

In addition to determining and displaying a PV panel configuration for an installation site, PV design module 106 can also predict the PV energy production of the PV panels (see block 220 of FIG. 2). Specifically, user interface 600 may include an interactive window 604 for displaying any suitable information that a potential customer would be interested in knowing. For instance, the interactive window 604 may display mounting plane/panel information, such as the number of panels that are able to be installed in the mounting plane. In another example, the interactive window 604 may display the total PV energy that could be generated by the current PV configuration. Additionally, the interactive window 604 may allow a user to input known information, such as, but not limited to, panel type, roof pitch, panel spacing, and panel tilt. However, the user may not know this information. For example, as shown in FIG. 6, the user may not know the roof pitch of the proposed installation site, and the PV design module may use a default roof pitch to calculate and display the predicted energy generation. The default roof pitch may be significantly different than the actual roof pitch of the proposed installation site which may result in the display of an inaccurate prediction of the energy generated (e.g., displaying 4.2 kW when the actual pitch would yield a system size of 5.5 kW).

According to embodiments of the present invention, in addition to predicting the PV energy production of the PV panels by entering in known information, PV design module 106 can predict the PV energy production of the PV panels by utilizing data from neighboring sites (see blocks 214, 216, and 218 of FIG. 2) as shown in the example user interface 700. This may be useful in instances where useful information about the proposed installation site is not known and thus cannot be entered by the user. In an embodiment, a radio button 606 is used to allow the user to prompt the PV design module 106 to send a request for structural data of neighboring sites. Although embodiments disclosed herein illustrate a radio button, any form of input that actively or passively initiates the sending of the request is envisioned herein. As already discussed herein with respect to FIG. 1, PV design module 106 may access databases, such as structure database 112, to request and receive information about the structure of neighboring sites. Accordingly, in embodiments, PV design module 106 may request and receive roof pitch data from neighboring homes.

Figure 7:
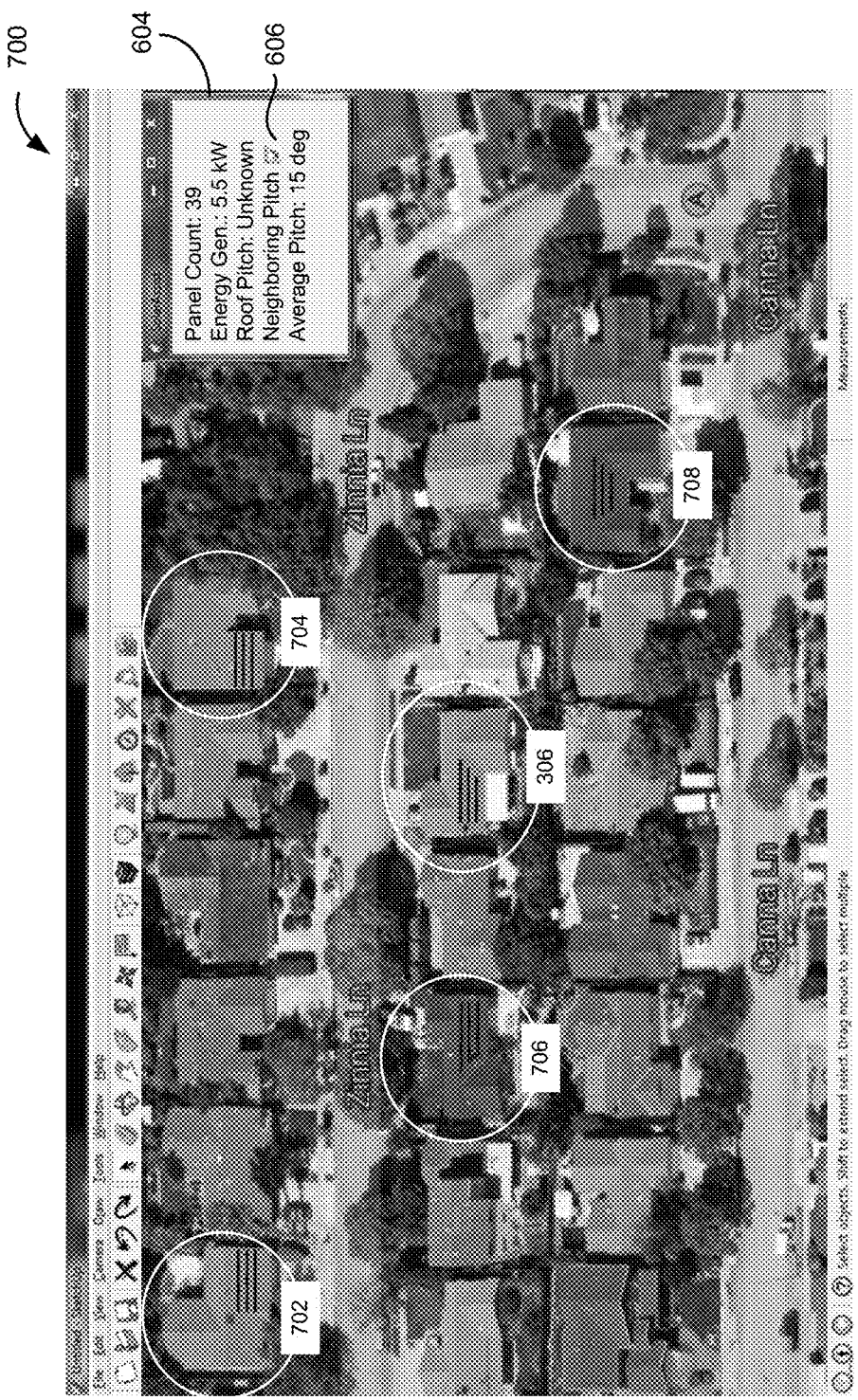
FIG. 7 is an example graphical user interface depicting neighboring sites of an installation site for predicting energy generation of a PV system in accordance with an embodiment of the present invention.

As an example, FIG. 7 illustrates the proposed installation site 306 and neighboring homes 702, 704, 706, and 708. The neighboring homes may be determined according to proximity and/or density. For instance, neighboring homes may be determined according to whether the homes are located within the same zip code as the potential installation site. In another example, neighboring homes may be determined according to whether the homes are located within the same neighborhood as designated by city design. Alternatively, neighboring homes may be determined according to whether the homes are located within a radial distance (e.g., 5 miles) of the proposed installation site. Further, neighboring homes may be determined according to the number of such homes within a small, nearby area (i.e., density). It is to be appreciated that a neighboring home may be determined according to any structural similarity and/or relative vicinity. Neighboring homes that do not have their structural information in the database 112, or homes that have recently changed its structure, may not be considered by the PV design module 106. As shown in FIG. 7, neighboring homes may be determined based upon whether structural information is already known from previous installations in the same neighborhood. Because these homes have a PV system installed, it is likely that there is extensive structural information about those neighboring sites. Accordingly, data, such as roof pitch data, can be gathered from databases stored with this information.

Figure 8:
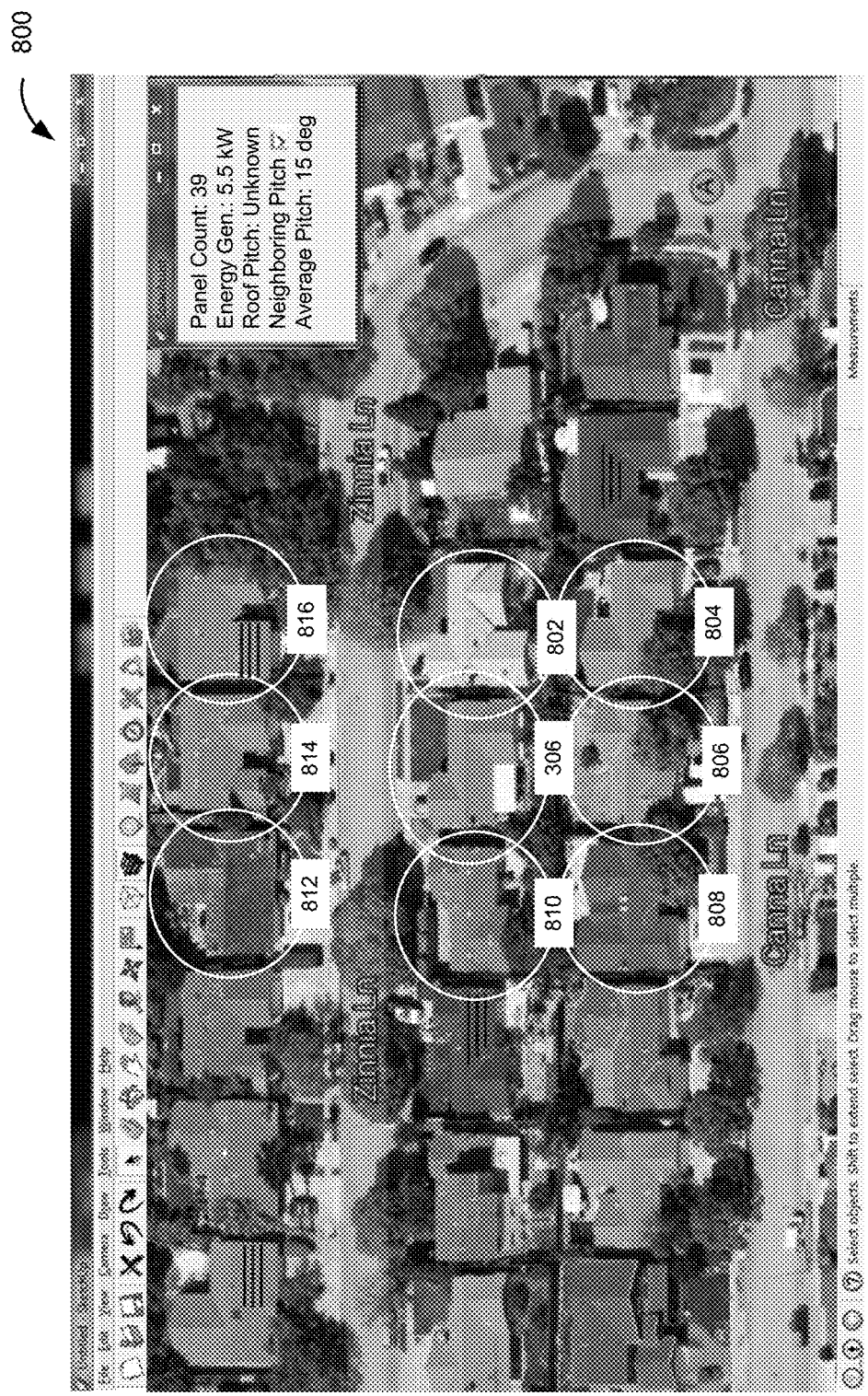
FIG. 8 is an example graphical user interface depicting immediately adjacent sites of an installation site for predicting energy generation of a PV system in accordance with an embodiment of the present invention.

In embodiments, neighboring sites may also be determined based upon their proximity to the installation site. For instance, FIG. 8 illustrates neighboring sites determined based upon their immediate proximity to the installation site. The neighboring sites may include houses closest to installation site 306, such as houses 802, 804, 806, 808, 810, 812, 814, and 816. These homes may be good candidates from which to gather structural information about the installation site 306 because such homes may have designs that are similar to that of the installation site 306. This may be particularly true for neighborhoods that have established floor plans that are used for the homes in the entire neighborhood. In such embodiments, the information of the neighboring homes 802, 804, 806, 808, 810, 812, 814, and 816 may be stored in a database, or may be determined based upon imagery gathered from a satellite. The imagery can be analyzed to determine the roof pitches of the homes. In embodiments, a PV design module, such as PV design module 106 in FIG. 1A, may provide this analysis. Alternatively, a third party may provide this analysis as discussed herein with respect to FIG. 1B.

Figure 9:
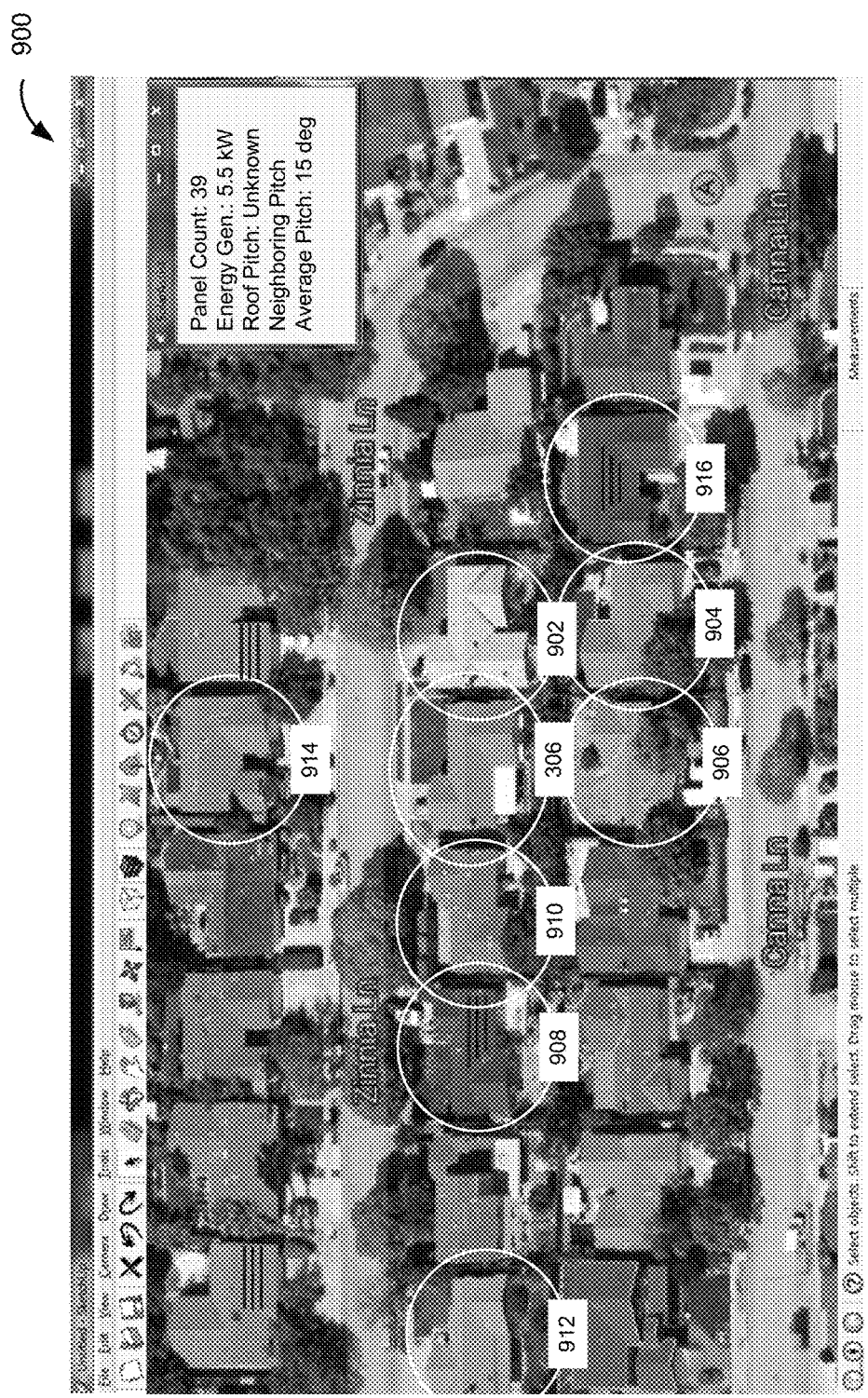
FIG. 9 is an example graphical user interface depicting sites having profiles similar to that of an installation site for predicting energy generation of a PV system in accordance with an embodiment of the present invention.

In some embodiments, the immediately adjacent homes may not have similar structural designs. Accordingly, selecting immediately adjacent homes to gather structural data about the installation site 306 may not be particularly useful. Thus, the neighboring sites may be determined based upon their structural similarity from imagery, such as satellite images. FIG. 9 illustrates neighboring sites determined based upon their structural similarity with the installation site. The neighboring sites include houses having a similar structural profile to installation site 306, such as houses 902, 904, 906, 908, 910, 912, 914, and 916. These homes may be good candidates from which to gather structural information about the installation site 306 because such homes may have designs that are similar to that of the installation site 306. In such embodiments, the satellite imagery can be analyzed to determine the roof pitches of the homes. In embodiments, a PV design module, such as PV design module 106 in FIG. 1A, may provide this analysis. Alternatively, a third party may provide this analysis as discussed herein with respect to FIG. 1B.

Once the data is received, it may then be averaged together to determine a relatively accurate estimation of the roof pitch of the proposed installation site. The average roof pitch may then be utilized in the calculation of the energy generation of the PV system. For instance, if the neighboring homes 702, 704, 706, and 708 from FIG. 7 have roof pitches of 14, 15, 15, and 16 degrees, respectively, the average of those numbers, (i.e., 15 degrees) may be used as the roof pitch of the proposed installation site. The roof pitches of neighboring homes may be in a database because of a previous PV system install. Averaging the roof pitch of nearby homes helps predict the actual roof pitch of the proposed installation site. Using the average roof pitch of neighboring homes increases the accuracy of the predicted PV energy generation of the proposed installation site. Accordingly, the user may use this information to make an informed decision about whether or not he or she would like to proceed with installing the PV system. It is to be appreciated that although embodiments disclosed herein relate to roof pitch, other embodiments that relate to any type of information that would be useful in determining a more accurate prediction of the PV energy generation is envisioned herein.

Computer System for the PV Design Module

Figure 10:
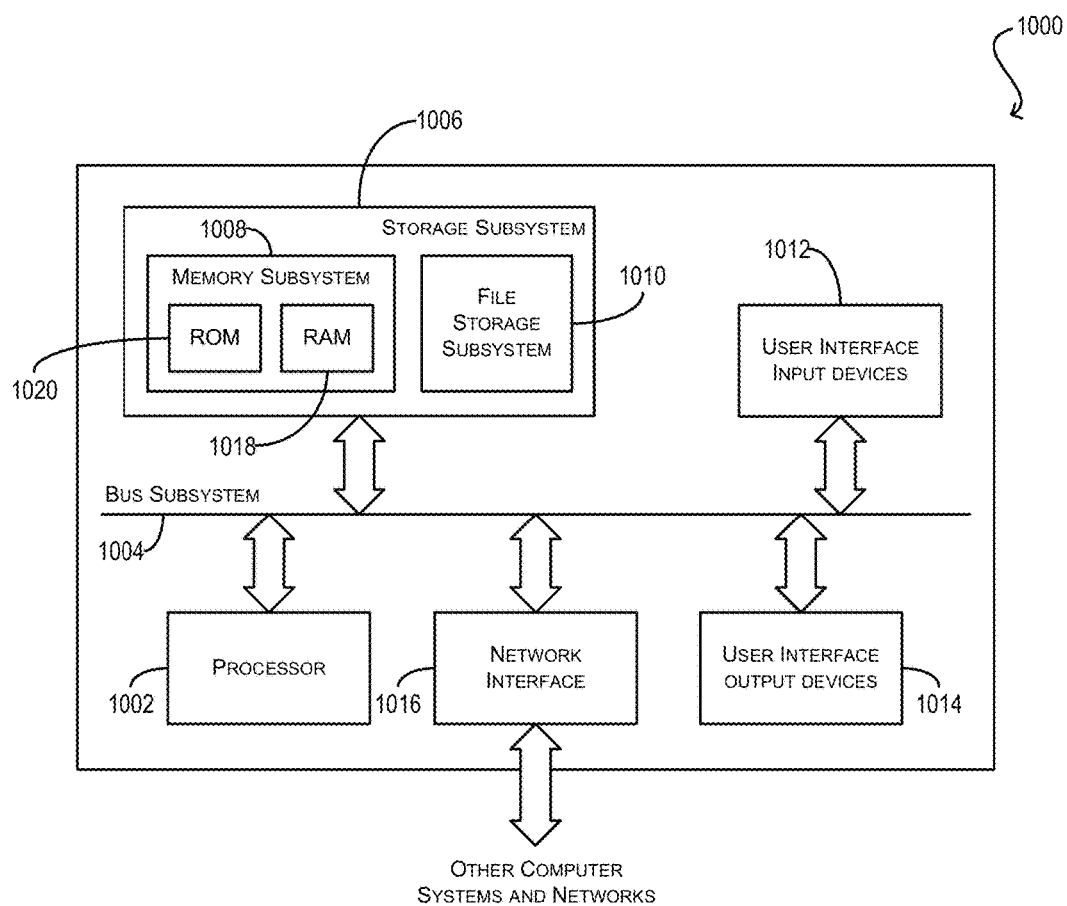
FIG. 10 is a simplified block diagram of a computer system in accordance with an embodiment of the present invention.

FIG. 10 is a simplified block diagram of a computer system 1000 according to an embodiment of the present invention. In one embodiment, computer system 1000 can be used to implement computing device 102 of FIG. 1. As shown in FIG. 8, computer system 1000 can include one or more processors 1002 that communicate with a number of peripheral devices via a bus subsystem 1004. These peripheral devices can include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between computer system 1000 and other computer systems or networks. Embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 can include a memory subsystem 1008 and a file/disk storage subsystem 1010. Subsystems 1008 and 1010 represent non-transitory computer-readable storage media that can store program code and/or data that provide the functionality of embodiments of the present invention.

Memory subsystem 1008 can include a number of memories including a main random access memory (RAM) 1018 for storage of instructions and data during program execution, and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments of the present invention. Many other configurations having more or fewer components than system 1000 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method of online photo-voltaic (PV) module installation modeling, the method comprising:
receiving, by a software application hosted on a web server and through a graphical user interface, an address and zip code of a proposed installation site;
displaying, on the graphical user interface, an image of the installation site;
receiving, by the software application and through the graphical user interface, an input identifying a mounting plane on the image, the mounting plane corresponding to a selected bounded region to install a PV module array;
displaying, on the graphical user interface, the mounting plane on the image of the proposed installation site;
determining an optimum number of PV modules that would fit within the mounting plane;
displaying, on the graphical user interface, the optimum number of PV modules on the mounting plane;
sending, by the software application, a request to an external data source for roof pitch data, the roof pitch data comprising one or more existing roof pitches of neighboring sites within the zip code, the external data source comprising a database of previous PV module installations;
receiving the roof pitch data of the neighboring sites from the external data source;
determining an average roof pitch of the neighboring sites based on at least a portion of the roof pitch data;
calculating a predicted PV generation based on the number of PV modules in the mounting plane and the average roof pitch of the neighboring sites, and
displaying, on the graphical user interface, the predicted PV generation.

2. The method of claim 1, wherein the neighboring sites comprise residences or buildings within a neighborhood.

3. The method of claim 2, wherein the proposed installation site and the neighboring sites are located within the same neighborhood.

4. The method of claim 2, wherein the proposed installation site and the neighboring sites have similar housing structures.

5. The method of claim 2, wherein the roof pitch data includes more than one roof pitch of the residences or buildings within the neighborhood.

6. The method of claim 1, wherein the neighboring sites are within a five mile radius of the proposed installation site.

7. The method of claim 1, wherein the image of the proposed installation site is a satellite or aerial image.

8. The method of claim 1, wherein the mounting plane includes a plurality of points defining a polygon, the polygon having been drawn on the image by a user.

9. The method of claim 8, wherein the installation site is a residence or building, the polygon having been drawn on a roof surface of the residence or building.

10. The method of claim 1, wherein calculating a predicted PV generation comprises:
   calculating production values for the PV modules; and
   modifying the production values by the average roof pitch data.

11. A system comprising:
   a processor configured to:
      receive, through a graphical user interface, an address and zip code of a proposed installation site;
      display, on the graphical user interface, an image of the installation site;
      receive, through the graphical user interface, an input identifying a mounting plane on the image, the mounting plane corresponding to a selected bounded region to install a PV module array;
      display, on the graphical user interface, the mounting plane on the image of the proposed installation site;
      determine an optimum number of PV modules that would fit within the mounting plane;
      display, on the graphical user interface, the optimum number of PV modules on the mounting plane;
      send a request for roof pitch data, the roof pitch data comprising one or more existing roof pitches of neighboring sites within the zip code;
      receive the roof pitch data of the neighboring sites;
      determine an average roof pitch of the neighboring sites based on at least a portion of the roof pitch data;
      calculate a predicted PV generation based on the number of PV modules in the mounting plane and the average roof pitch of the neighboring sites, and
      display, on the graphical user interface, the predicted PV generation.

12. The system of claim 11, wherein the neighboring sites comprise residences or buildings within a neighborhood.

13. The system of claim 12, wherein the proposed installation site and the neighboring sites are located within the same neighborhood.

14. The system of claim 12, wherein the proposed installation site and the neighboring sites have similar housing structures.

15. The system of claim 12, wherein the roof pitch data includes more than one roof pitch of the residences or buildings within the neighborhood.

16. A non-transitory computer-readable storage medium having stored thereon program code executable by a computer system, the program code comprising:
   code that causes the computer system to receive, through a graphical user interface, an address and zip code of a proposed installation site;
   code that causes the computer system to display, on the graphical user interface, an image of the installation site;
   code that causes the computer system to receive, through the graphical user interface, an input identifying a mounting plane on the image, the mounting plane corresponding to a selected bounded region to install a PV module array;
   code that causes the computer system to display, on the graphical user interface, the mounting plane on the image of the proposed installation site;
   code that causes the computer system to determine an optimum number of PV modules that would fit within the mounting plane;
   code that causes the computer system to display, on the graphical user interface, the optimum number of PV modules on the mounting plane;
   code that causes the computer system to send a request to an external data source for roof pitch data, the roof pitch data comprising one or more existing roof pitches of neighboring sites within the zip code, the external data source comprising a database of previous PV module installations;
   code that causes the computer system to receive the roof pitch data of the neighboring sites from the external data source;
   code that causes the computer system to determine an average roof pitch based on at least a portion of the roof pitch data of the neighboring sites;
   code that causes the computer system to calculate a predicted PV generation based on the number of PV modules in the mounting plane and the average roof pitch of the neighboring sites, and
   code that causes the computer system to display, on the graphical user interface, the predicted PV generation.

17. The non-transitory computer-readable storage medium of claim 16, wherein the neighboring sites comprise residences or buildings within a neighborhood.

18. The non-transitory computer-readable storage medium of claim 17, wherein the proposed installation site and the neighboring sites are located within the same neighborhood.

19. The non-transitory computer-readable storage medium of claim 17, wherein
   the proposed installation site and the neighboring sites have similar housing structures.

20. The method of claim 1, wherein:
   the graphical user interface comprises a 3D design program,
   the 3D design program is a 3D web browser program, and
   the input identifying the mounting plane on the image is created by the 3D design program.

* * * * *